(12) United States Patent
Wu

(10) Patent No.: US 6,321,777 B1
(45) Date of Patent: Nov. 27, 2001

(54) WALL-TYPE SHOWER FAUCET INFLUENT LOAD CONTROL FIXTURE

(76) Inventor: Faucet Wu, No. 40, 326 Lane, Chang-Ding Road, Lu-Kang Chen, Chang-Hua Hsien (TW)

( * ) Notice: Subject to any disclaimer, the term of this patent is extended or adjusted under 35 U.S.C. 154(b) by 0 days.

(21) Appl. No.: 09/563,744

(22) Filed: May 4, 2000

(51) Int. Cl.⁷ .............................. F16K 43/00; F16K 11/22
(52) U.S. Cl. .................... 137/315.12; 137/357; 137/360; 137/549; 137/606; 137/613
(58) Field of Search .......................... 137/315.12, 329.2, 137/329.3, 329.4, 359, 360, 549, 550, 606, 625.15, 625.17, 15.01, 315.01, 613

(56) References Cited

U.S. PATENT DOCUMENTS

| | | | |
|---|---|---|---|
| 517,550 | * 4/1894 | Messinger | 137/329.4 |
| 1,116,689 | * 11/1914 | Gehrke | 137/549 |
| 1,787,445 | * 1/1931 | Gade | 137/606 |
| 1,930,590 | * 10/1933 | Ebinger | 137/329.4 |
| 2,310,485 | * 2/1943 | Wyckoff | 137/329.4 |
| 2,598,131 | * 5/1952 | O'Donnell | 137/549 |
| 3,363,652 | * 1/1968 | James | 137/329.4 |
| 3,370,709 | * 2/1968 | James | 137/329.4 |
| 3,374,957 | * 3/1968 | Tyler | 137/606 |
| 3,570,537 | * 3/1971 | Kelly | 137/606 |
| 3,840,046 | * 10/1974 | Busquets | 137/549 |
| 4,957,137 | * 9/1990 | Wang | 137/549 |
| 5,388,610 | * 2/1995 | Chaung | 137/549 |

FOREIGN PATENT DOCUMENTS

| | | | |
|---|---|---|---|
| 2029257 | * 12/1971 | (DE) | 137/606 |
| 2035280 | * 1/1972 | (DE) | 137/606 |
| 2821092 | * 11/1979 | (DE) | 137/606 |
| 961499 | * 11/1962 | (GB) | 137/606 |

* cited by examiner

Primary Examiner—George L. Walton
(74) Attorney, Agent, or Firm—Dougherty & Troxell

(57) ABSTRACT

A wall type shower faucet including a mixing valve and a faucet body having: first and second water inlet channels communicating with the mixing valve; a first load control passage in communication with the first water inlet channel; a second load control passage in communication with the second water inlet channel; a first rear passage communicating with the first water inlet channel; a second rear passage communicating with the second water inlet channel; a first water supply channel communicating with the first rear passage; and a second water supply channel communicating with the second rear passage. A junction pin cap is mounted in each first and second rear passage with a movable stem member mounted in each junction pin cap. Each movable stem member has a sealing washer and a tip portion extending into the associated load control passage. A spring member acts between each junction pin cap and the associated movable stem member to bias the sealing member into contact with the faucet body, thereby sealing off communication between the associated rear passage and load control passage. An adjustment pin cap is removably mounted in each load control passage, each adjustment pin cap having a filter screen and engaging the tip portion of one of the movable stem members to displace the sealing washer out of contact with the faucet body. When the adjustment pin cap is removed from the faucet body, the sealing washer is biased into sealing contact with the faucet body to prevent water leakage.

1 Claim, 3 Drawing Sheets

WALL-TYPE SHOWER FAUCET INFLUENT LOAD CONTROL FIXTURE

BACKGROUND OF THE INVENTION

1). Field of the Invention

The invention herein relates to wall-type shower faucet influent load control fixture consisting of load control passages conjoined by an adjustment pin cap at the center section of a horizontally oriented water supply channel; since a water inlet port is formed in the hollow rear section of the said adjustment pin cap, when the adjustment pin cap is inserted into the bottom section, this provides for alignment with an internal section water inlet channel; formed in the internal section sides of the load control passages is an input opening that is in continuity with the water supply channel; as such, a utilized junction pin cap rear section is inserted and due to the center section hollow passage of the cap body area, this provides for the sleeving in of a movable stem; since an annular compression spring fixed in position on the said stem, this causes the tip of stem to be moved forward to achieve the normal water closed state; furthermore, since a tip at the front section of the movable stem extends forward to a stem hole at the bottom of the internal section of the adjustment pin cap, when the adjustment pin cap is inserted, the entire stem is pushed to the rear, this causes a water sealing washer at the center section of the stem to separate from the inner edge at the rear section of a tap hole, thereby achieving the opened state of water admittance operation; and a cylindrical water filter screen element is installed in the hollow rear section of the adjustment pin cap and capable of first straining out and collecting particulate impurities in the supplied water, which is among the innovative features of the invention herein.

2). Description of the Prior Art

In the evolution of water faucet structures and following the development of precision water control porcelain valves, since both cold and hot water could be outputted from a single opening after left and right circuits were adjustably mixed in a ratio, with operational convenience that was superior to conventional types, they were widely utilized by manufacturers and consumers. However, since a pair of tightly affixed porcelain blocks were installed in the center section of water control porcelain valves to eliminate the occurrence of a vacuum frequently induced during the water supply process, the vacuum elimination valves situated at the lower section and internal sides of the porcelain valves were all precision throughput specification components and when they encountered larger impurities or massive particulate thereof (referred to hereafter as particulate impurities), what always occurred after particulate impurities suspended in water passed through was the blockage of the passages inside which resulted in impeded water output, stoppage, or poor warm water adjustment and control.

To solve the said particulate impurities caused phenomenon that resulted in damaging the internally installed porcelain valve-type faucets, most required the prefabrication of a triangular bend (or elbow) in the wall and then connecting the bathtub faucet or basin faucet and so on to the front extent or upper extent of the said triangular bend, or onto the body of the said triangular bend; better structures were equipped with special water filtering screen devices (such as U.S. Pat. No. 174,423 "Multiple Water Source Suspension Capability Filtering Connector Structure" and other similar or equivalent structures in the Republic of China Patent Bulletin) that accomplished a preliminary water source filtering operation. Furthermore, regarding such filtering operations relative to their utilization while a water faucet was being utilized, particulate impurities damage to internally installed components were prevented, achieving greater degree of protective application and enabling the durability and service life of such triangular bend structures to be lengthened considerably. Additionally, it was not necessary to disassemble the body of the water faucet; water admittance to the said triangular bend are was first stopped so the particulate impurities filtered could be cleaned out and it was an extremely convenient, reasonable, and practical structural assembly approach.

However, what the wall-type shower faucet (indicated in FIG. 1) of the invention herein addresses is: since pre-positioned cold and hot water supply water supply pipelines are coordinated between two passageways embedded in the walls, the positions of which are coordinated with two passageways of two water supply pipes routed at the center section position of a water output pipe and then the horizontally oriented water inlet end connector is placed along two lateral positions of the water faucet body and conjoined either at the upper or lower section position of the initial water pipe connector. Following installation, only the operating handle and the water output pipe is visible in the wall surface; as a result, the structure has no remaining space to support the installation of a triangular bend. Under such conditions, there is absolutely no water filtering handling at the water inlet pipe end section resulting from the installation of such conventional wall-type shower faucets due to direct installation to the wall surfaces. As such, the installation approach of faucet internal components as protective fixtures is completely foregone and all particulate impurities in water in the water pipe enter the internal section of the porcelain valve, which naturally results in the forced wearing of the said water control porcelain blocks, the internal walls, the vacuum elimination valve, and other precision components and the subsequent occurrence of water leakage, loss of operating control, and even the obstruction of the internal section water channel and so on, seriously leading to faulty utilization performance as well as poor durability and service life in this type of wall-type shower faucet; users must frequently remove, repair, or replace the porcelain components in the internal section of the faucet body. As such, utilizing this type of faucet structure results in a high degree of inconvenience and, furthermore, is quite uneconomical. In view of the said shortcomings, the inventor of the invention herein completed the invention herein which, furthermore, is of thoroughly and completely improved design.

SUMMARY OF THE INVENTION

The primary objective of the invention herein is to provide a wall-type shower faucet influent load control fixture in which load control passages are formed in the horizontally oriented water supply channel in the center section of the body, providing for insertion of an adjustment pin cap; furthermore, a water inlet port is formed in the hollow rear section of the said adjustment pin cap and when the pin cap in inserted into the bottom section, it is in alignment with a water inlet channel; formed in the internal section sides of the load control passages is an input opening that is in continuity with the water supply channel; as such, a utilized junction pin cap rear section is inserted and due to the center section hollow passage of the cap body area, this provides for the sleeving in of a movable stem having an annular compression spring fixed in position on its rear section. As such, the pushing forward of the tip of the stem achieves the normal water closed state; furthermore, since the tip at the front section of the movable stem extends forward to a stem hole at the bottom of the internal section of the adjustment pin cap, when the adjustment pin cap is inserted, the entire stem is pushed to the rear, this causes a water sealing washer at the center section of the stem to separate from the inner edge at the rear section of a tap hole, thereby achieving the open state of water admittance operation; therefore, a cylindrical water filter screen element can be installed in the hollow rear section of the adjustment pin cap that is capable of first straining out and collecting particulate impurities in the supplied water to protect the porcelain valve, the vacuum eliminator, and other precision components installed in the internal section of the faucet body and thereby effectively prolong their durability and service life, which is among the innovative features of the invention herein.

Another objective of the invention herein is to provide a wall-type shower faucet influent load control fixture in which when the particulate impurities collected in the filter screen reach a certain volume, the user only has to screw out the adjustment pin cap and since the annular compression spring at the rear section of the movable stem then pushes it forward, the forward motion automatically places the said tap hole in the water closed state such that after the user directly rotates the entire adjustment pin cap, the particulate impurities are directly evacuated; furthermore, after the filter screen is reinstalled, the adjustment pin cap is screwed back to its original position and the movable stem is pushed to the rear, the water sealing washer at the center section of the stem separates from the inner edge at the rear section of the tap hole, thereby restoring the said area to the water opened admittance state; this provides absolute convenience and precludes the necessity of shutting off the water supply at a remote end to clean out particulate impurities and is the basis of daily faucet structure maintenance operations, which is among the innovative features of the invention herein.

To enable a further understanding of the structure, innovative features, functions, and other practical objectives of the invention herein, the brief description of the drawings below is followed by the detailed description of the invention.

DETAILED DESCRIPTION OF THE INVENTION

Figure 1:
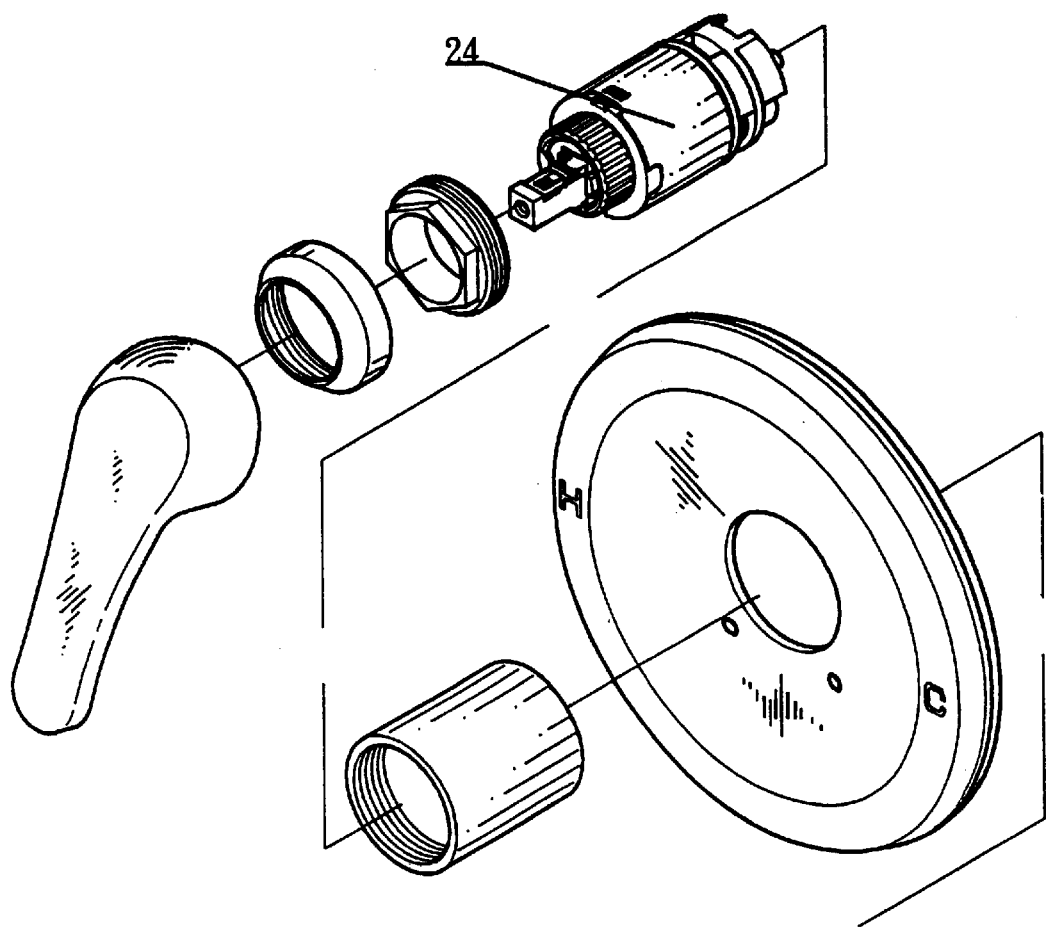
FIG. 1 is an exploded (partially assembled) drawing of an embodiment of the invention herein.
Figure 1:
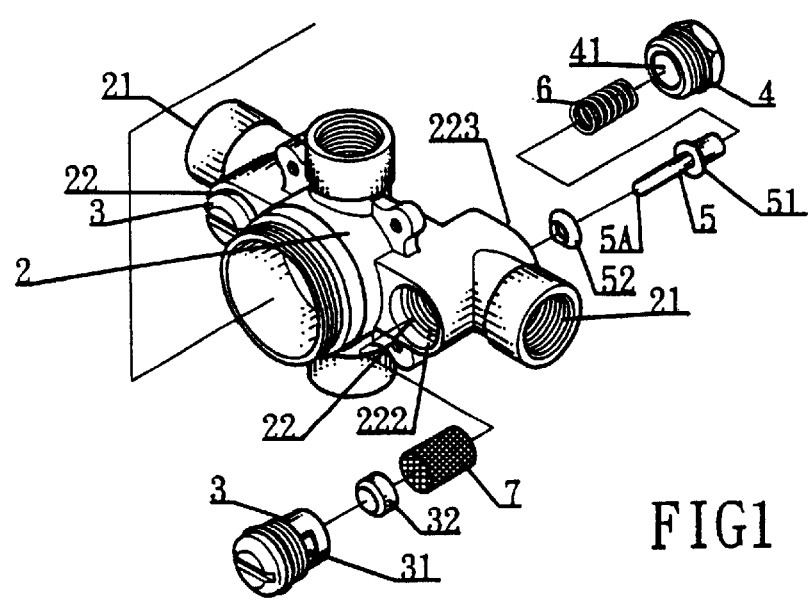
Figure 2:
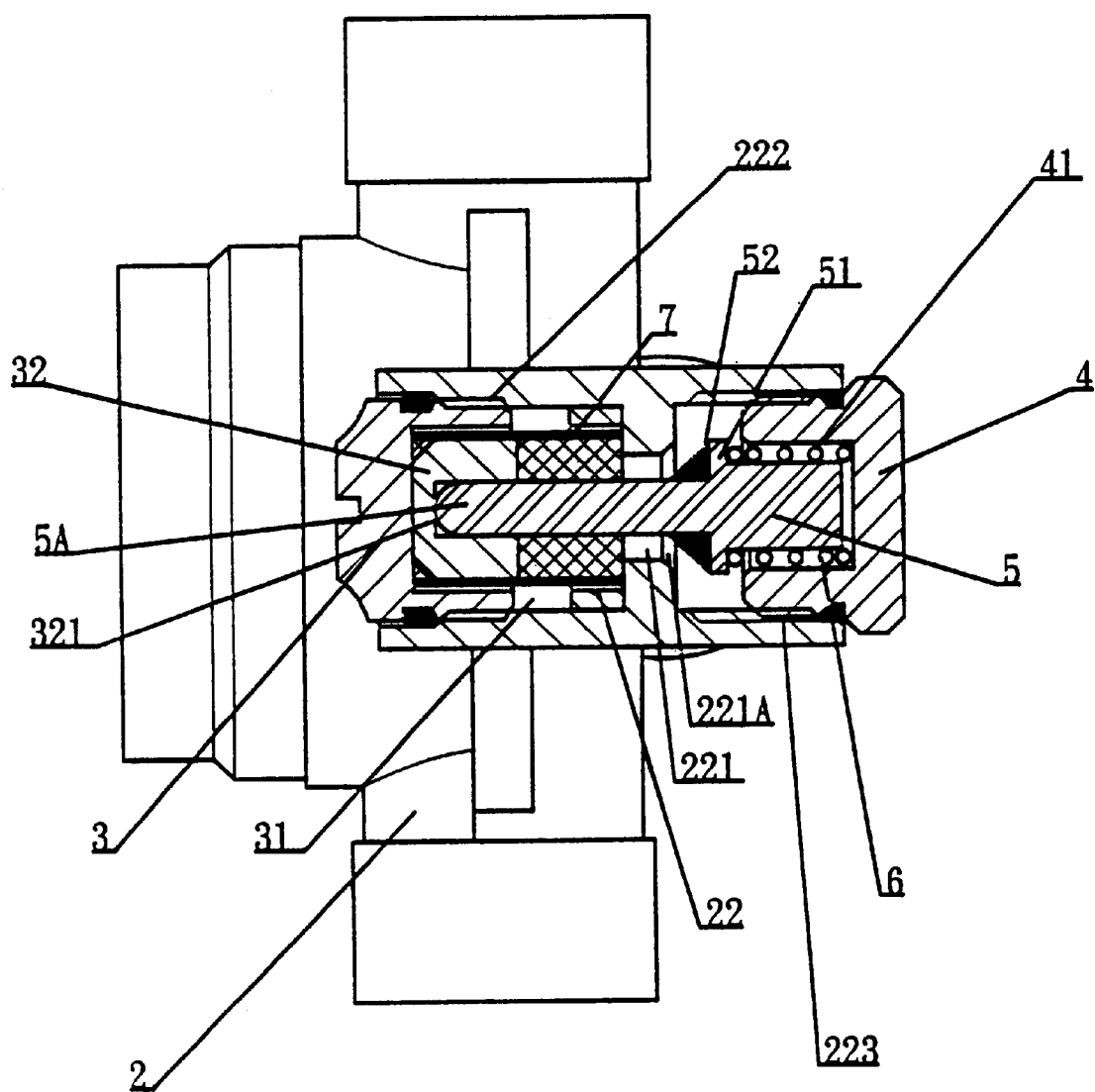
FIG. 2 is a cross-sectional drawing of the invention herein as viewed from a vertical perspective.
Figure 3:
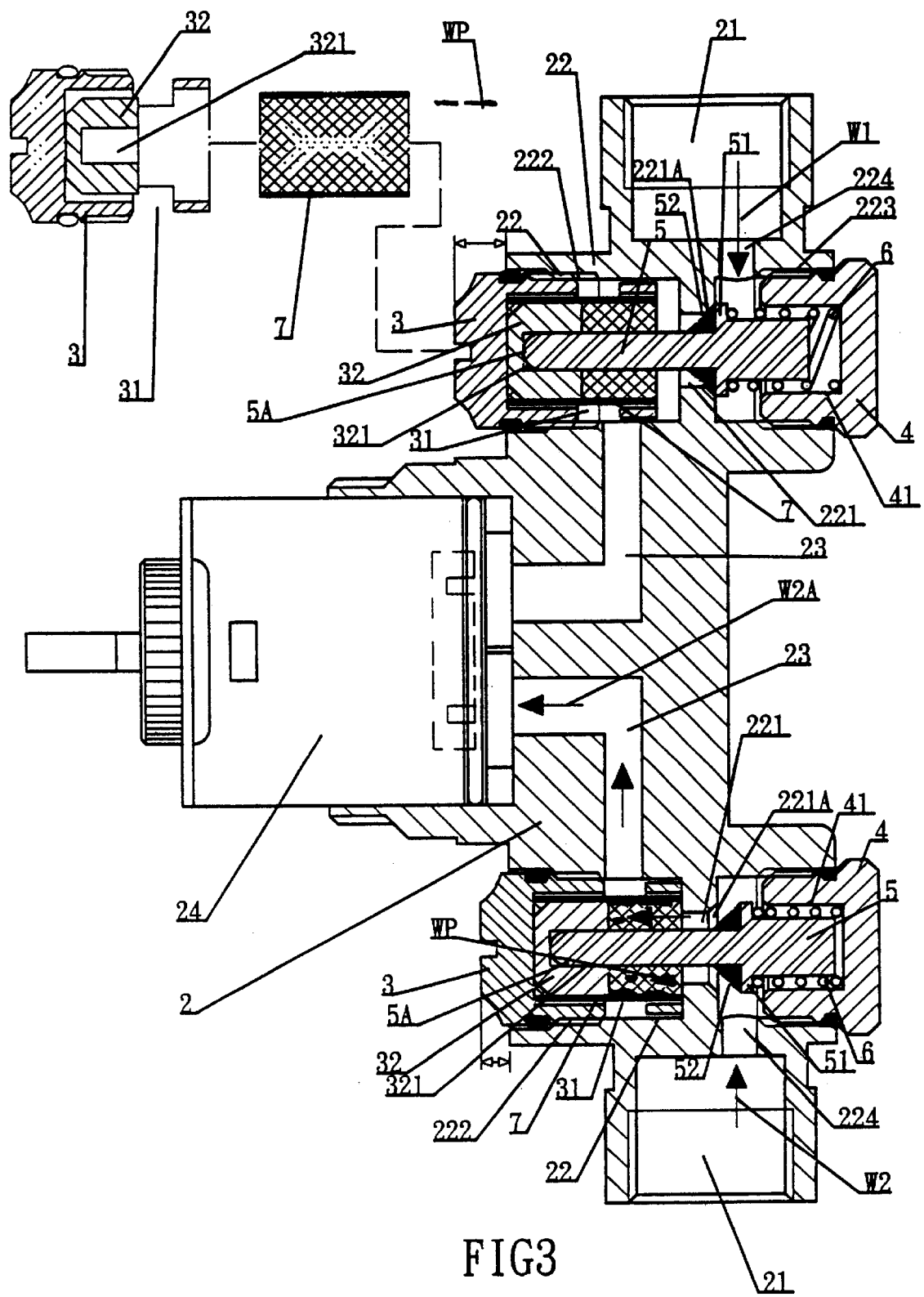
FIG. 3 is a cross-sectional drawing of the invention herein as viewed from a horizontal perspective (the right section is in the water supply closed state and the left side is in the water supply open state).

Referring to FIG. 1 in conjunction with FIG. 2 and FIG. 3, the invention herein consists of a faucet body 2 having disposed along the two sides of its center section area a horizontally oriented and inward facing a water supply channel 21, with a load control passage 22 formed through the front and rear; at the internal front section of the said load control passage 22 is a tap hole 221 and a larger front internally threaded passage 222; the said front internally threaded passage 222 providing for the insertion and conjoinment of an adjustment pin cap 3, of which:

The rear section of the said adjustment pin cap 3 is hollow and, furthermore, has a water inlet port 31 formed in it; as such, when the pin cap 3 is inserted into the bottom section position, it is in alignment with the water inlet channel 23 in the internal section of the body 2; at the rear section of the load control passage 22 is another relatively centered tap hole 221 and a larger rear internally threaded passage 223; the said rear internally threaded passage 223 providing for the insertion and conjoinment of a junction pin cap 4; wherein, the internal section lateral area of the rear internally threaded passage 223 is connected to the rear extent of the center section tap hole 221 and disposed in continuity with an input opening 224 in the external section of the water supply channel 21.

As such, before the utilized junction pin cap 4 rear section is inserted, the center section hollow passage 41 of the cap body 4 area provides for the sleeving in of the rear section of a movable stem 5 as well as the fixed placement of an annular compression spring 6 inside the front section of the cap body 4 hollow passage 41 such that as the stem 5 is normally pushed forward, this causes the front section of the water sealing washer 52 sleeved onto the faceted surface at the center section of the stem 5 to be pushed against the inner edge 221A at the rear section of the tap hole 221, thereby achieving the water closed state by blocking the water flow W1 along the internal sides the water supply channel 21 and preventing flow through the tap hole 221 (the tap hole 221 is obstructed in the water closed state, as indicated in the right section of FIG. 3); wherein, the tip SA at the front section of the movable stem 5 extends forward to the stem hole 321 at the center section of the plug block 32 at the bottom of the internal section of the adjustment pin cap 3, such that when the adjustment pin cap 3 is inserted, since the entire stem 5 is pushed to the rear, this causes the water sealing washer 52 at the center section of the stem 5 to separate from the rear section of the tap hole 221 towards the water inlet channel 23 in the internal section of the body 2, and enter into the porcelain valve 24 installed at its rear extent to adjust and control water flow as well as the mixture of water volume at the two sides during the normal water admittance operation state (the tap hole 221 is not obstructed in the water opened state, as indicated in the left section of FIG. 3).

In addition, installed inside the end section of the plug block 32 and the rear section of the obstructed and positioned adjustment pin cap 3 is a cylindrical water filter screen element 7 and since the said water filter screen element 7 is suitably situated at the water inlet port 31 in the internal side of the rear section of the adjustment pin cap 3, it is thus in the path of the water flow W2 passing through the tap hole 221 and capable of first straining out particulate impurities WP contained in it and, furthermore, collecting the particulate impurities in the internal section of the filter screen element 7, enabling a certain degree of cleanliness in the water flow W2A of the water inlet channel 23 towards the body 2, thereby maintaining the quality of water flowing past the porcelain valve 24 component in the internal section of the body 2 and effectively prolonging its durability and service life, which constitutes the most innovative feature of the invention herein (the complete water filtering operation during the water supply state is shown in FIG. 3).

Furthermore, when the particulate impurities WP collected in the filter screen 7 reach a certain volume, the user only has to screw out the adjustment pin cap 3, at which time, since the annular compression spring 6 at the rear section of the movable stem 5 pushes it forward, the forward motion automatically places the said tap hole 221 in the blocked water closed state, as indicated in FIG. 3, such that after the user directly rotates the entire adjustment pin cap 3

(as shown by the imaginary line at the right section and upper extent of FIG. 3), the particulate impurities WP are directly evacuated downward or the particulate impurities WP are directly removed from the filter screen 5 to clean it. After the filter screen 7 is reinstalled, the adjustment pin cap 3 is screwed back to its original position, at which time, due to the downward pressure of the adjustment pin cap, 3, the water sealing washer 52 at the center section of the stem 5 separates once again from the inner edge 221A at the rear section of the tap hole 221, thereby restoring the said are to the open water admittance and water filtering operations state (the water supplying state, as shown in the left section of FIG. 3).

As the user is in the process of cleaning away particulate impurities wp, since the movable stem 5 automatically proceeds forward to close off the supply of water and automatically recedes to re-open the supply of water, turning off the water supply at a remote end is completely unnecessary, while providing the user with a faucet structure that is the most convenient to repair, maintain, and operate, which is another innovative feature of the invention herein.

What is claimed is:

1. A wall type shower faucet including a mixing valve and comprising;
    a) a faucet body having: first and second water inlet channels communicating with the mixing valve; a first load control passage in communication with the first water inlet channel; a second load control passage in communication with the second water inlet channel; a first rear passage communicating with the first water inlet channel; a second rear passage communicating with the second water inlet channel; a first water supply channel communicating with the first rear passage; and a second water supply channel communicating with the second rear passage;
    b) a junction pin cap mounted in each first and second rear passage;
    c) a movable stem member mounted in each junction pin cap, each movable stem member having a sealing washer and a tip portion extending into the associated load control passage;
    d) a spring member acting between each junction pin cap and the associated movable stem member so as to bias the sealing washer into contact with the faucet body, thereby sealing off communication between the associated rear passage and load control passage;
    e) adjustment pin caps removably mounted in the load control passages, said adjustment pin caps having plug blocks disposed therein, said plug blocks receiving an outermost portion of said stems opposite said sealing washers, the adjustment pin caps having filter screens surrounding a portion of said stems between said plug blocks and said sealing washers, wherein movement of said adjustment pin caps against said plug blocks move the movable stem members to displace the sealing washers out of contact with the faucet body thereby enabling water to flow into the water supply channels, the rear passages, the load control passages and through the filter screens before entering the water inlet chambers, whereby removal of the adjustment pin caps from the faucet body enables the sealing washers to be moved into sealing contact with the faucet body, while at the same time removing said plug blocks and said filter screens for servicing said filter screens from said outermost stem portions.

\* \* \* \* \*